(12) United States Patent
Lin et al.

(10) Patent No.: US 11,195,320 B2
(45) Date of Patent: Dec. 7, 2021

(54) FEED-FORWARD COLLISION AVOIDANCE FOR ARTIFICIAL REALITY ENVIRONMENTS

(71) Applicant: Facebook Technologies, LLC, Menlo Park, CA (US)

(72) Inventors: Jeng-Weei Lin, Redmond, WA (US); Gioacchino Noris, Zurich (CH); Alessia Marra, Zurich (CH); Alexander Sorkine Hornung, Zurich (CH)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/712,489

(22) Filed: Dec. 12, 2019

(65) Prior Publication Data

US 2021/0183135 A1   Jun. 17, 2021

(51) Int. Cl.
| *G06T 15/20* | (2011.01) |
| *G06T 19/00* | (2011.01) |
| *G06T 15/04* | (2011.01) |
| *G06T 7/13* | (2017.01) |
| *G06F 3/14* | (2006.01) |
| *G06F 3/01* | (2006.01) |
| *G06F 3/0346* | (2013.01) |

(52) U.S. Cl.
CPC .............. *G06T 15/20* (2013.01); *G06F 3/012* (2013.01); *G06F 3/0346* (2013.01); *G06F 3/14* (2013.01); *G06T 7/13* (2017.01); *G06T 15/04* (2013.01); *G06T 19/006* (2013.01)

(58) Field of Classification Search
None
See application file for complete search history.

(56) References Cited

U.S. PATENT DOCUMENTS

| 9,595,115 | B1 * | 3/2017 | Cederlof | ................. G06F 3/011 |
| 9,754,167 | B1 * | 9/2017 | Holz | .................. G06K 9/00355 |
| 2012/0249741 | A1 * | 10/2012 | Maciocci | .............. G06T 15/503 |
| | | | | 348/46 |
| 2018/0093186 | A1 * | 4/2018 | Black | ..................... A63F 13/211 |
| 2019/0385371 | A1 * | 12/2019 | Joyce | .................. G06F 3/04842 |
| 2020/0241733 | A1 * | 7/2020 | Drake | ..................... G06F 3/011 |

* cited by examiner

*Primary Examiner* — Tize Ma
(74) *Attorney, Agent, or Firm* — Shumaker & Sieffert, P.A.

(57) ABSTRACT

An artificial reality system includes a head mounted display (HMD) and a physical overlay engine that generates overlay image data, referred to herein as a physical overlay image, corresponding to the physical objects in a three-dimensional (3D) environment. In response to an activation condition, a rendering engine of the artificial reality system renders the overlay image data to overlay artificial reality content for display on the HMD, thereby apprising a user of the HMD of their position with respect to the physical objects in the 3D environment.

17 Claims, 12 Drawing Sheets

FEED-FORWARD COLLISION AVOIDANCE FOR ARTIFICIAL REALITY ENVIRONMENTS

TECHNICAL FIELD

This disclosure generally relates to artificial reality systems, such as virtual reality, mixed reality, and/or augmented reality systems, and more particularly, to avoiding collisions in artificial reality environments.

BACKGROUND

Artificial reality systems are becoming increasingly ubiquitous with applications in many fields such as computer gaming, health and safety, industrial, training and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head mounted display (HMD) worn by a user and configured to output artificial reality content to the user. The artificial reality content may include completely computer generated content or generated content combined with captured content (e.g., real-world video and/or images). During operation, the user may utilize a hand-held device, keyboard or other devices to interact with applications and the artificial reality system.

SUMMARY

In general, this disclosure describes artificial reality systems and, more specifically, an overlay engine for artificial reality systems that constructs overlay image data providing visual indications of physical objects in a physical environment in which a user of the artificial reality system is located. The overlay image data can be overlaid on artificial reality content, such as fully immersive virtual reality content, being presented to the user by the artificial reality system. Thus, a user of the artificial reality system can use the overlay image data to avoid collisions with any nearby physical objects in the physical environment, thereby keeping the user safe and helping to ensure an uninterrupted artificial reality experience.

As further described herein, artificial reality content presented by an artificial reality system does not necessarily coincide with the physical dimensions and physical objects of a physical environment, such as a room in which a user of an artificial reality system is located. When a user interacts with an artificial reality system, the user initially may have a mental model of the physical environment, including the location of physical objects in the physical environment. However, as the user continues using the artificial reality system and potentially moves about the physical environment, the user's mental model may become less accurate, thereby increasing the risk of collisions with objects in the physical environment. For example, a user may be using an artificial reality system within a room of their home. There may be furniture and other physical objects in the room. The user may start an artificial reality application while in one location of the room, but as the artificial reality application progresses, may move to other locations with the room. A technical problem with conventional artificial reality systems is that the systems do not provide any way for the user to determine the user's location with respect to physical objects in the room. For example, the artificial reality content presented by the artificial reality application may obscure or completely cover some or all of the physical objects in the room. Thus, the user may be forced to temporarily displace or remove their HMD in order to determine where they are in the physical environment to avoid collisions with physical objects that may be nearby. This can be a distraction to the user, leading to user dissatisfaction and frustration with the operation of the artificial reality system.

As a technical solution to the aforementioned technical problem, the artificial reality system of this disclosure includes a physical overlay engine that generates overlay image data representing physical objects in the room. The overlay image data can include, as examples, partial images, a single image or a set of images. In general, the overlay image data can be overlaid with the artificial reality content, thereby allowing the users to determine their location with respect to physical objects in the room without interrupting their artificial reality experience. In some aspects, overlaying the image data with the artificial reality content includes rendering the overlay image data with the artificial reality content such that the user can see both the artificial reality content and the overlay image data at the same time.

The overlay image data can be generated and overlaid in response to a request by the user, for example via a button press on a hand-held device of the artificial reality system. The overlay image data may be temporary and may be shown only when activated by the user. Thus, the physical overlay engine can provide an image of the physical objects in a physical environment. The user can utilize the overlaid image to refresh their mental map of the room and avoid collisions with objects in the room. Further, the user can utilize the overlaid image to plan future movements within the room.

An overlay image can be generated and displayed in response to other activation conditions besides a button press. For example, the overlay image may be generated and displayed in response to user input besides a button press such as touching or hovering over a touch sensitive surface or presence sensitive device, a voice command, hand gesture or other form of user input. Further, the overlay image may be automatically generated and displayed in response to crossing or coming within a threshold distance of a virtual boundary defined by the user or artificial reality system. Also, the overlay image may be automatically generated and displayed in response to coming within a threshold distance of a physical object.

The aspects described above, and further aspects described below can provide a technical improvement over conventional artificial reality system implementations, and can provide one or more practical applications, such as enabling an artificial reality system to provide overlay image data representative of physical objects in the user's physical environment. The overlay image data may be overlaid with artificial reality content. Thus, the user can plan and make movements in the physical environment to avoid collisions with physical objects without interrupting their artificial reality experience.

In one or more example aspects, an artificial reality system includes one or more image capture devices configured to capture image data representative of a three-dimensional (3D) physical environment having one or more physical objects; a head mounted display (HMD) configured to output artificial reality content associated with a 3D virtual environment; a physical overlay engine configured to: determine, from the image data, data representing the physical objects, and generate, from the data representing the physical objects, overlay image data representing the physical objects; and a rendering engine configured to render, based on a pose of the HMD, output image data comprising the artificial reality content without including image data representative of the physical objects in the 3D physical environment; wherein in response to an activation condition, the physical overlay engine generates the overlay image data representing the physical objects and the rendering engine renders the overlay image data representing the physical objects with the output image data comprising the artificial reality content.

In one or more further example aspects, a method includes obtaining image data representative of a three-dimensional (3D) physical environment having one or more physical objects; rendering, by a rendering engine of an artificial reality system and based on a pose of a head mounted display (HMD) representing an estimated position and orientation of the HMD within the 3D physical environment, output image data comprising artificial reality content without including image data representative of the one or more physical objects; and in response to an activation condition, determining, from the image data, data representing the one or more physical objects, and generating, from the data representing the physical objects, overlay image data representing the physical objects, and rendering, by the rendering engine, the overlay image data representing the physical objects with the output image data comprising the artificial reality content.

In one or more additional example aspects, a non-transitory, computer-readable medium comprises instructions that, when executed, cause one or more processors of an artificial reality system to obtain image data representative of a three-dimensional (3D) physical environment having one or more physical objects; determine an HMD pose representing an estimated position and orientation of the HMD within the 3D physical environment; render, based on the HMD pose, output image data comprising artificial reality content without including image data representative of the one or more physical objects; and in response to an activation condition, determine, from the image data, data representing the one or more physical objects, and generate, from the data representing the one or more physical objects, overlay image data representing the physical objects, and render the overlay image data representing the physical objects with the output image data comprising the artificial reality content.

The details of one or more examples of the techniques of this disclosure are set forth in the accompanying drawings and the description below. Other features, objects, and advantages of the techniques will be apparent from the description and drawings, and from the claims.

BRIEF DESCRIPTION OF DRAWINGS

Like reference characters refer to like elements throughout the figures and description.

DETAILED DESCRIPTION

Figure 1A:
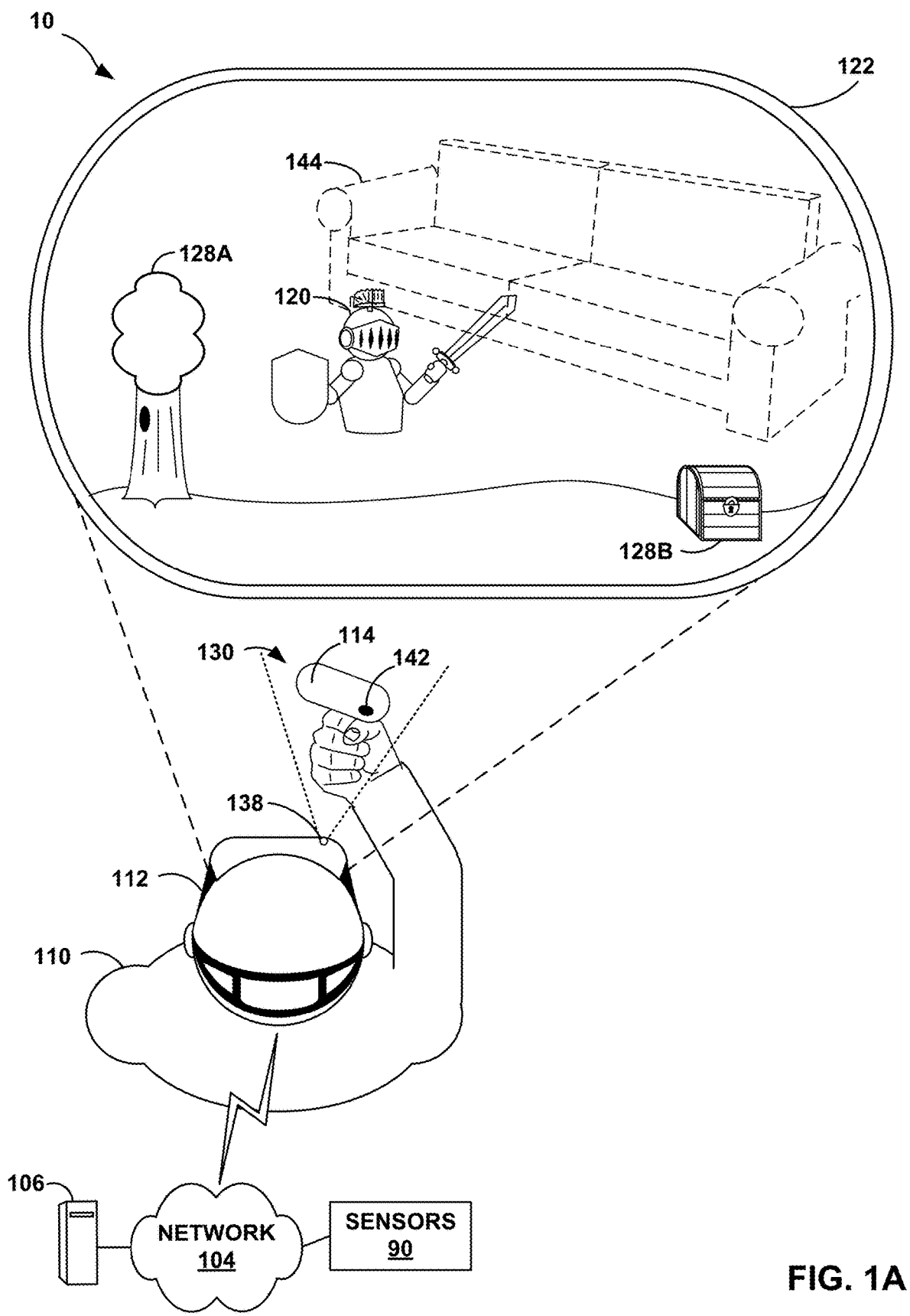
FIG. 1A is an illustration depicting an example artificial reality system that generates and displays an overlay image as an aid in collision avoidance in accordance with the techniques of the disclosure.

FIG. 1A is an illustration depicting an example artificial reality system 10 that generates and displays overlay image data as an aid in collision avoidance in accordance with the techniques of the disclosure. In some example implementations, artificial reality system 10 generates and renders artificial reality content 122 to a user 110. The artificial reality content 122 can include one or more graphical elements 120, 128 that represent avatars and virtual objects that may be part of an AR or VR experience. In addition, overlay image data can be presented with the artificial reality content 122 that may show physical objects that are in, or in proximity to, a physical environment occupied by user 110. In the example illustrated in FIG. 1A, the overlay image data includes a representation 144 of a couch that is in the physical environment occupied by user 110.

In the example of FIG. 1A, artificial reality system 10 includes head mounted device (HMD) 112. As shown, HMD 112 is typically worn by user 110 and includes an electronic display and optical assembly for presenting artificial reality content 122 to user 110. In addition, HMD 112 includes one or more motion sensors (e.g., accelerometers) for tracking motion of the HMD 112 and may include one or more image capture devices 138, e.g., cameras, infrared (IR) detectors, Doppler radar, line scanners and the like, for capturing image data of the surrounding physical environment.

In some example implementations HMD 112 operates as a stand-alone, mobile artificial reality system. In other implementations, an artificial reality system 10 can optionally include a console 106 and/or one or more external sensors 90 in addition to, or instead of HMD 112. In the example illustrated in FIG. 1A, console 106 is shown as a single computing device, such as a gaming console, workstation, a desktop computer, or a laptop. In other examples, console 106 may be distributed across a plurality of computing devices, such as a distributed computing network, a data center, or a cloud computing system. Console 106, HMD 112, and sensors 90 may, as shown in this example, be communicatively coupled via network 104, which may be a wired or wireless network, such as WiFi, a mesh network or a short-range wireless communication medium.

In general, artificial reality system renders artificial reality content 122 for display to user 110. In the example of FIG. 1A, user 110 views the artificial reality content 122 constructed and rendered by an artificial reality application executing on HMD 112 and/or console 106. In some aspects, the artificial reality content 122 may be completely computer constructed, as in the case of a fully immersive VR experience. For example, the artificial reality content 122 may not include representations of some or all the physical objects in the physical environment occupied by user 110. As one example, artificial reality content 122 may be a consumer gaming application in which user 110 is rendered as avatar 120 with one or more virtual objects 126, 128A, 128B. In some aspects, the artificial reality content 122 can include representations of physical objects in a different physical environment from that of user 110. As an example, the artificial reality content may be associated with a video conferencing application, a virtual navigation application, or a virtual travel application. In the case of a video conferencing application, the artificial reality content may include the physical objects in a room occupied by a participant of the video conferencing application other than user 110. In the case of a virtual travel application, the physical object may include the physical objects in a travel destination. In such cases, the artificial reality content 122 may include physical objects that are in a separate physical environment from that occupied by the user 110 but does not include physical objects in the same physical environment as that occupied by the user 110.

During operation, the artificial reality application constructs artificial reality content 122 for display to user 110 by tracking and computing pose information for a frame of reference, typically a viewing perspective of HMD 112. Using HMD 112 as a frame of reference, the artificial reality application renders 3D artificial reality content 122. During this process, the artificial reality application uses sensed data received from HMD 112 and the one or more hand-held devices 114, such as movement information and user commands, and, in some examples, data from any external sensors 90, such as external cameras, to capture 3D information within the real world, physical environment, such as motion by user 110 and/or motion of the one or more hand-held devices 114. Based on the sensed data, the artificial reality application determines a current pose for the frame of reference of HMD 112, a current pose for the one or more hand-held devices 114 and, in accordance with the current poses of the HMD 112 and hand-held devices 114, renders the artificial reality content 122. In the example illustrated in FIG. 1A, the artificial reality application can render virtual objects such as virtual sword 126 based on a pose of the HMD 112 and one or more hand-held devices 114. Further, in response to an activation condition, the artificial reality application can render overlay image data with the artificial reality content. In the example illustrated in FIG. 1A, the overlay image data includes an image 144 of a couch that is in the physical environment occupied by user 110.

More specifically, as further described herein, image capture devices 138 of HMD 112 capture image data representative of objects in the real world, physical environment that are within a field of view 130 of image capture devices 138. Field of view 130 typically corresponds with the viewing perspective of HMD 112. Physical objects in the physical environment can include objects such as walls, furniture, televisions, monitors, plants, etc. In some aspects, the artificial reality content 122 may not include any representations of the physical objects. For example, in the case of a totally immersive VR experience, the artificial reality content may be generated by one or more processors according to the artificial reality application. Thus, the user 110 may not be fully aware of the location of physical objects in the physical environment because they are not presented as part of the artificial reality content 122. As a result, the user 110 may rely on their "mental map" of the physical environment formed prior to the user wearing HMD 112, or by temporarily removing or displacing the HMD 112 in order to view the physical environment.

In some aspects, overlay image data can be presented with the artificial reality content to apprise the user 110 of the location of physical object in the physical environment occupied by the user 110. Thus, the user can refresh their "mental map" of the location of the objects in order to avoid colliding with the object during their AR/VR experience. The display of the overlay image data may be temporary and may be presented in response to an activation condition. The overlay image data may be presented during the presence of the activation condition, and not be presented if the activation condition is not satisfied. Using the example illustrated in FIG. 1A as an example, the activation condition can be detection that a button 142 on a hand-held device 114 has been pressed. The image 144 of the couch may not be present prior to pressing button 142. In response to detection that button 142 has been pressed, the image 144 of the couch may be presented along with artificial reality content 122. The image may be presented for a predetermined or configurable amount of time after the button 142 is pressed, or it may be presented for as long as the button 142 is pressed. When the activation condition is no longer satisfied, for example, after the time period for display has passed or if the button is no longer pressed, the image 144 of the couch may no longer be presented.

Other activation conditions are possible. Examples of such other activation conditions include detection of touching or hovering over a touch sensitive surface or presence sensitive device, detection of a voice command associated with the activation condition, detection of hand gesture or position associated with the activation condition, etc. Further, the overlay image may be automatically generated and displayed in response to detection that the HMD 112 or hand-held device 114 has crossed or come within a threshold distance of a virtual boundary defined by the user or artificial reality system. Also, the overlay image may be automatically generated and displayed in response to detection that the HMD 112 or hand-held device 114 is within a threshold distance of a physical object.

The graphical representation of physical objects in the overlay image data may be created in various ways. In some aspects, the graphical representation of physical objects in the overlay image data may be "shadow objects", e.g. semi-transparent images of the physical objects, that allow at least a portion of the artificial reality content 122 to be viewed through the graphical representation of the physical object. In some aspects, the graphical representation of the physical objects in the overlay image data may be rendered as line representations (e.g., as outlines) of the corresponding physical object as depicted by image 144 in FIG. 1A. The line representation may be rendered such that edges corresponding to the associated physical object are visible while the interior of the line representation is partially or fully transparent.

Accordingly, the techniques of the disclosure provide specific technical improvements to the computer-related field of rendering and displaying content by an artificial reality system. For example, artificial reality systems as described herein may provide a high-quality fully immersive artificial reality experience to a user, such as user 110, of the artificial reality application by generating and rendering graphical elements that are not necessarily based on the object in the physical environment occupied by the user. Further, artificial reality systems as described herein may provide a mechanism by which the user may participate in an immersive artificial reality experience and avoid collisions with physical objects in the physical environment occupied by the user. Overlay image data that includes graphical representations of the physical objects in the physical environment occupied by the user may be rendered, at least temporarily, with the generated artificial reality content in response to an activation condition.

A further technical improvement is that the collision avoidance capability provided by the techniques described herein are feed-forward as opposed to conventional feedback implementations that merely warn the user when the system determines that the user is too close to a physical object. In other words, the feed-forward technique described herein provides the ability for a user to quickly refresh their mental map of the physical environment they occupy prior to any collisions with physical objects. The user can refresh their mental map without the interruption of the artificial reality experience that may be caused by removing or displacing their HMD 112. Thus, the user may utilize their refreshed mental map to plan future strategies for the artificial reality experience that may involve movements within the physical environment without fear of collisions with physical objects. This is in contrast to the feedback approach of conventional systems that typically provide warnings to a user when the user is too close to a physical object. Thus, in the feedback collision avoidance system of conventional artificial reality systems, the user reacts to avoid a collision, which may interrupt their artificial reality experience.

Figure 1B:
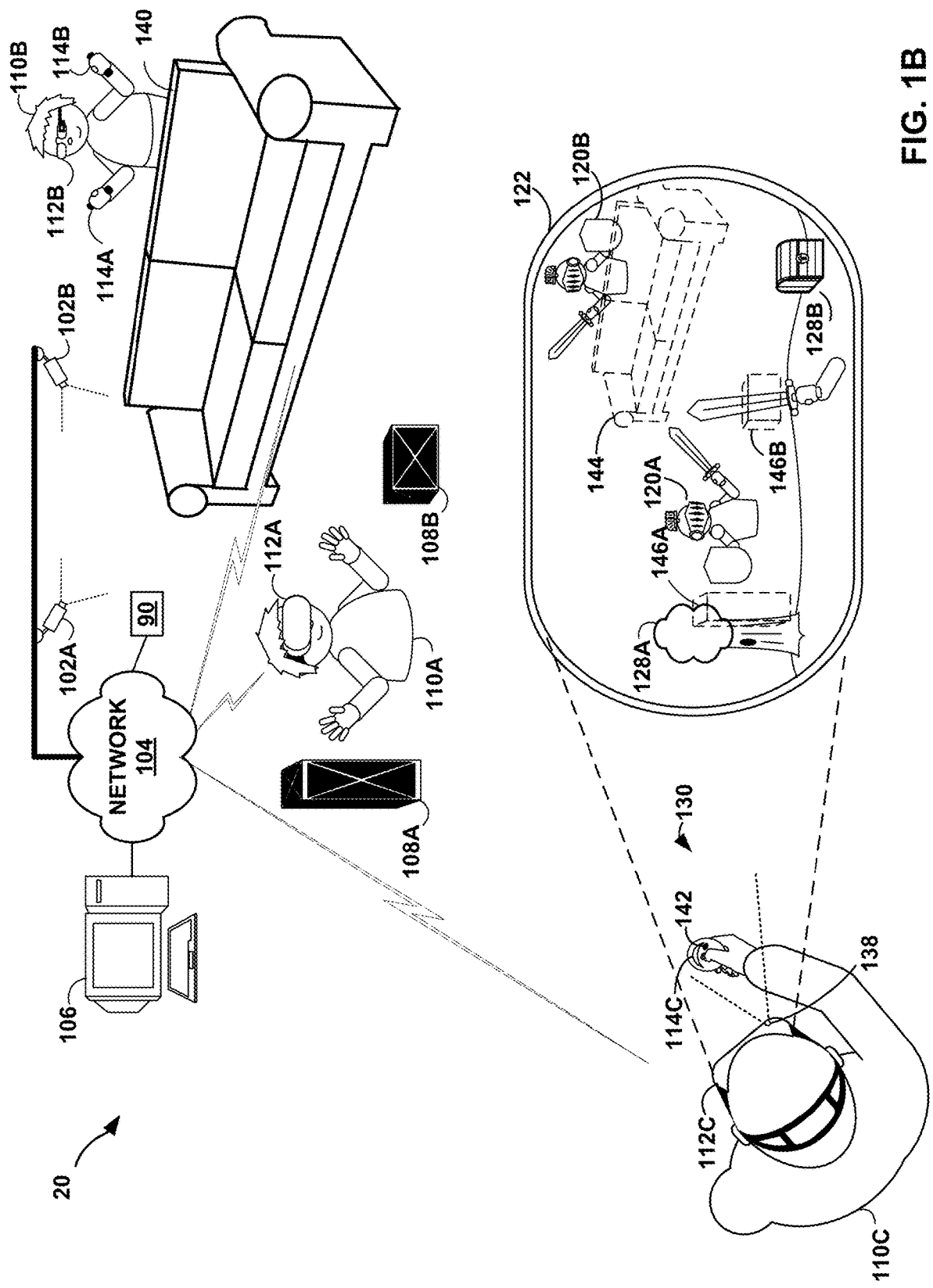
FIG. 1B is an illustration depicting another example artificial reality system that generates and displays an overlay image as an aid in collision avoidance in accordance with the techniques of the disclosure.

FIG. 1B is an illustration depicting another example artificial reality system 20 that generates and displays overlay image data as an aid in collision avoidance in accordance with the techniques of the disclosure. Similar to artificial reality system 10 of FIG. 1A, in some examples, artificial reality system 20 of FIG. 1B may, in response to an activation condition, render overlay image data with artificial reality content.

In the example of FIG. 1B, artificial reality system 20 includes external cameras 102A and 102B (collectively, "external cameras 102"), HMDs 112A-112C (collectively, "HMDs 112"), hand-held devices 114A, 114B and 114C (collectively, "hand-held devices 114"), console 106, and sensors 90. As shown in FIG. 1B, artificial reality system 20 represents a multi-user environment in which an artificial reality application executing on HMDs 112 and/or console 106 presents artificial reality content to each of users 110A-110C (collectively, "users 110") based on a current viewing perspective of a corresponding frame of reference for the respective user. That is, in this example, the artificial reality application constructs artificial reality content by tracking and computing pose information for a frame of reference for each of HMDs 112 and respective hand-held devices 114. Further, artificial reality system 20 uses data received from cameras 102, HMDs 112, and hand-held devices 114 to capture 3D information regarding physical objects within the real world physical environment. As one example, the artificial reality application may render, based on a current viewing perspective determined for HMD 112C, immersive artificial reality content 122 having virtual objects 128A-128C (collectively, "virtual objects 128"). Additionally, artificial reality system can capture image data with respect to real world objects 108A-108C (collectively, "real world objects 108"). Further, from the perspective of HMD 112C, artificial reality system 20 renders avatars 120A, 120B based upon the estimated positions for users 110A, 110B, respectively. Also, the artificial reality system 20 can render graphical objects based on the poses of the hand-held devices 114 as determined by the artificial reality system 20.

In response to an activation condition, HMD 112C of user 110C may render overlay image data having an image 144 representing physical couch 140, and images 146A and 146B representing physical objects 108A and 108B in the physical environment of user 110C. As an example, the activation condition may be detecting that user 110C has pressed button 142 of their hand-held device 114C.

Each of HMDs 112 concurrently operates within artificial reality system 20. In the example of FIG. 1B, each of users 110 may be a "player" or "participant" in the artificial reality application, and any of users 110 may be a "spectator" or "observer" in the artificial reality application. HMD 112C may operate substantially similar to HMD 112 of FIG. 1A by rendering immersive artificial reality content including virtual objects such as sword 126 based on a determined pose of hand-held device 114C and presenting overlay image data in response to an activation condition.

HMD 112A and HMD 112B may also operate substantially similar to HMD 112 of FIG. 1A. HMD 112B may receive user inputs from hand-held devices 114A and 144B held by user 110B.

As shown in FIG. 1B, in addition to or alternatively to image data captured via camera 138 of HMD 112C, input data from external cameras 102 may be used to track and detect particular motions, positions and orientations of a user 110, and the locations and orientations of physical objects in the physical environment occupied by a user 110.

Figure 2A:
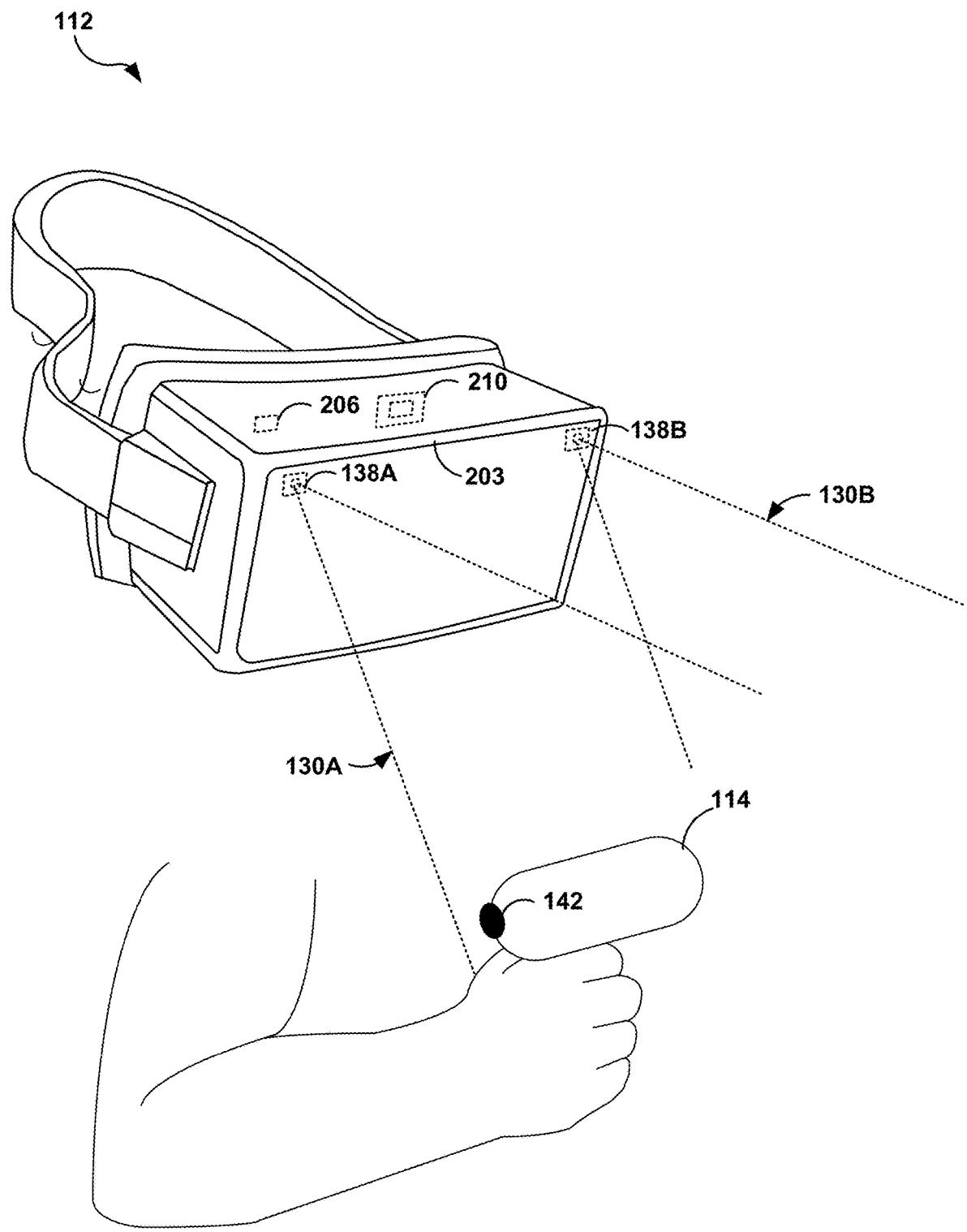
FIG. 2A is an illustration depicting an example HMD that operates in accordance with the techniques of the disclosure.

FIG. 2A is an illustration depicting an example HMD 112 and hand-held device 114 configured to operate in accordance with the techniques of the disclosure. HMD 112 of FIG. 2 may be an example of any of HMDs 112 of FIGS. 1A and 1B. HMD 112 may operate as a stand-alone, mobile artificial realty system configured to implement the techniques described herein or may be part of an artificial reality system, such as artificial reality systems 10, 20 of FIGS. 1A, 1B.

In this example, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

As further shown in FIG. 2A, in this example, HMD 112 further includes one or more motion sensors 206, such as one or more accelerometers (also referred to as inertial measurement units or "IMUs") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, IR scanners, laser scanners, Doppler radar scanners, depth scanners, or the like, configured to output image data representative of the physical environment. In some aspects, the image capture devices 138 can capture image data from a visible spectrum and an invisible spectrum of light (e.g., IR light). More specifically, image capture devices 138 capture image data representative of objects in the physical environment that are within a field of view 130A, 130B of image capture devices 138, which typically corresponds with the viewing perspective of HMD 112. HMD 112 includes an internal control unit 210, which may include an internal power source and one or more printed-circuit boards having one or more processors, memory, and hardware to provide an operating environment for executing programmable operations to process sensed data and present artificial reality content on display 203.

In the example illustrated in FIG. 2A, hand-held device 114 comprises a peripheral device that coexists with HMD 112 and, in some examples, operates as an auxiliary input/output device for HMD 112 in the artificial reality environment. Hand-held device 114 can communicate any detected user input to HMD 112 (and/or console 106 of FIG. 1A) using wireless communications links (e.g., Wi-Fi, near-field communication of short-range wireless communication such as Bluetooth), using wired communication links (not shown), or using other types of communication links. In some examples, hand-held device 114 can include one or more input buttons 142 for providing input to HMD 112. The one or more input buttons 142 may be physical buttons, or they may be virtual buttons, e.g., buttons provided on a touch sensitive screen of hand-held device 114. HMD 112 may receive information regarding the state of one or more buttons 142 on hand-held device 114. For example, HMD 112 may receive information indicating whether button 142 is currently pressed.

Figure 2B:
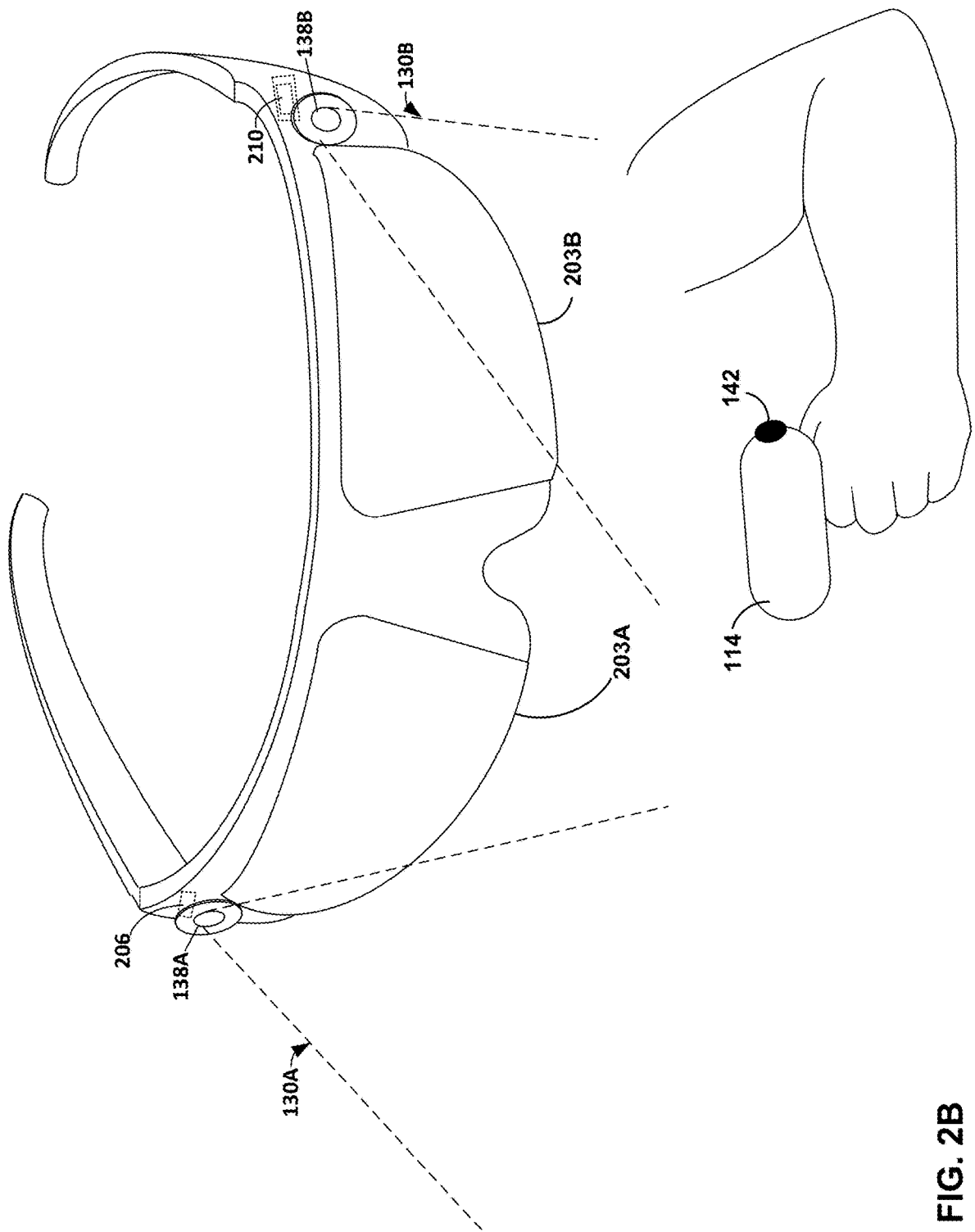
FIG. 2B is an illustration depicting another example HMD that operates in accordance with the techniques of the disclosure.

FIG. 2B is an illustration depicting an example HMD 112, in accordance with techniques of the disclosure. As shown in FIG. 2B, HMD 112 may take the form of glasses. HMD 112 of FIG. 2B may be an example of any of HMDs 112 of FIGS. 1A and 1B. HMD 112 may be part of an artificial reality system, such as artificial reality systems 10, 20 of FIGS. 1A, 1B, or may operate as a stand-alone, mobile artificial realty system configured to implement the techniques described herein.

In this example, HMD 112 are glasses comprising a front frame including a bridge to allow the HMD 112 to rest on a user's nose and temples (or "arms") that extend over the user's ears to secure HMD 112 to the user. In addition, HMD 112 of FIG. 2B includes interior-facing electronic displays 203A and 203B (collectively, "electronic displays 203") configured to present artificial reality content to the user. Electronic displays 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In the example shown in FIG. 2B, electronic displays 203 form a stereoscopic display for providing separate images to each eye of the user. In some examples, the known orientation and position of display 203 relative to the front frame of HMD 112 is used as a frame of reference, also referred to as a local origin, when tracking the position and orientation of HMD 112 for rendering artificial reality content according to a current viewing perspective of HMD 112 and the user.

As further shown in the example illustrated in FIG. 2B, HMD 112 further includes one or more motion sensors 206, such as one or more accelerometers (also referred to as inertial measurement units or "IMUS") that output data indicative of current acceleration of HMD 112, GPS sensors that output data indicative of a location of HMD 112, radar or sonar that output data indicative of distances of HMD 112 from various objects, or other sensors that provide indications of a location or orientation of HMD 112 or other objects within a physical environment. Moreover, HMD 112 may include integrated image capture devices 138A and 138B (collectively, "image capture devices 138"), such as video cameras, laser scanners, Doppler radar scanners, depth scanners, or the like, configured to output image data representative of the physical environment. HMD 112 includes an internal control unit 210, which may include an internal power source and one or more printed-circuit boards having one or more processors, memory, and hardware to provide an operating environment for executing programmable operations to process sensed data and present artificial reality content on display 203. In addition to HMD 112, the example illustrated in FIG. 2B includes a hand-held device 114, including one or more buttons 142. The operation and configuration of hand-held device 114 may be the same as described above with reference to FIG. 2A.

Figure 3:
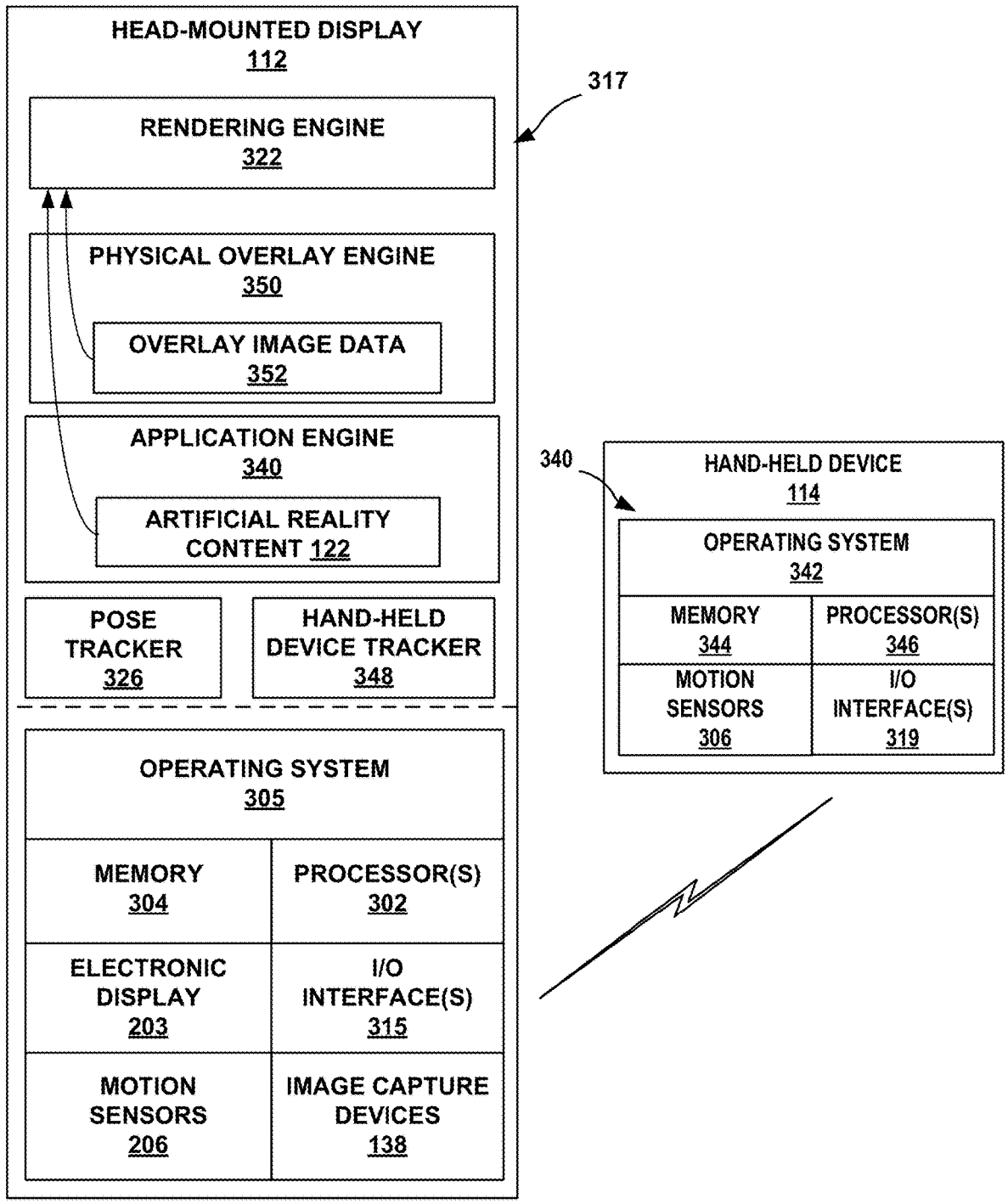
FIG. 3 is a block diagram depicting an example in which generating and displaying the overlay image is performed by an example instance of the HMD of the artificial reality systems of FIGS. 1A, 1B in accordance with the techniques of the disclosure.

FIG. 3 is a block diagram showing example implementations HMD 112 and hand-held device 114 of artificial reality system 10, 20 of FIGS. 1A, 1B. In the example of FIG. 3, HMD 112 performs pose tracking and rendering for HMD 112 and hand-held device 114, such as motion data and image data received from HMD 112 and/or hand-held device 114. HMD 112 can generate overlay image data 352 in accordance with the techniques described herein based on the image data and other data acquired by HMD 112.

In this example, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Processors 302 are coupled to one or more I/O interfaces 315, which provide I/O interfaces for communicating with hand-held device 114 via similar I/O interfaces 319 and other devices such as a keyboard, game controllers, display devices, image capture devices, other HMDs, and the like. Moreover, the one or more I/O interfaces 315, 319 may include one or more wired or wireless network interface controllers (NICs) for communicating with a network, such as network 104 (FIGS. 1A, 1B). Additionally, processors 302 are coupled to electronic display 203, motion sensors 206, and image capture devices 138. In some examples, processors 302 and memory 304 may be separate, discrete components. In other examples, memory 304 may be on-chip memory collocated with processors 302 within a single integrated circuit.

Software applications 317 of HMD 112 operate to provide an overall artificial reality application. In this example, software applications 317 include application engine 340, rendering engine 322, pose tracker 326, hand-held device tracker 348, and physical overlay engine 350.

In general, application engine 340 includes functionality to provide and present an artificial reality application, e.g., a gaming application, a teleconference application, a navigation application, an educational application, training or simulation applications, and the like. Application engine 340 may include, for example, one or more software packages, software libraries, hardware drivers, and/or Application Program Interfaces (APIs) for implementing an artificial reality application on HMD 112. Responsive to control by application engine 340, rendering engine 322 generates 3D artificial reality content for display to the user by application engine 340 of HMD 112. In some aspects, application engine 340 provides a fully immersive virtual reality experience in which all, or substantially all of the artificial reality content is generated by the application engine 340 and does not include images representative of physical objects in the physical environment occupied by the user.

Additionally, hand-held device tracker 348 may determine a pose for the hand-held device 114. In some aspects, hand-held device tracker 348 may receive information from sensors on the hand-held device 114 and use the received information to determine a pose for the hand-held device 114. Such information may include information from motion sensors 306. Further, hand-held device tracker 348 may use image data obtained via image capture devices 138 to determine a pose for the hand-held device 114.

Application engine 340 and rendering engine 322 construct the artificial content for display to user 110 in accordance with current pose information for HMD 112 within a frame of reference, typically a viewing perspective of HMD 112, as determined by pose tracker 326 and hand-held device tracker 348. Based on the current viewing perspective, rendering engine 322 constructs the 3D, artificial reality content. During this process, pose tracker 326 operates on sensed data received from HMD 112 and optionally controller measurement data received from hand-held device 114, such as movement information and user commands, and, in some examples, data from any external sensors 90 (FIGS. 1A, 1B), such as external cameras, to capture 3D information within the real-world environment, such as motion by user 110, and/or feature tracking information with respect to user 110. Based on the sensed data, pose tracker 326 determines a current pose for the HMD 112 within the frame of reference of HMD 112.

The application engine 340 and rendering engine 322 may, in accordance with the current pose of the HMD 112, construct and render artificial reality content for display to user 110 via electronic display 203.

Physical overlay engine 350 may, in response to an activation condition, generate overlay image data 352 that is rendered with the artificial reality content constructed by the application engine 340. As an example, in response to receiving an indication that a button has been pressed on hand-held device 114, physical overlay engine 350 may generate overlay image data 352. The overlay image data 352 can include representations of physical objects that are within the physical environment occupied by user 110. In some aspects, the physical objects may be those within the field of view of image capture devices 138. In some aspects, the physical object may be those within the field of view of other sensors such as external cameras 102 (FIG. 2).

The representations of the physical objects in the overlay image data 352 may be constructed from data representing the physical objects. In some aspects, the physical overlay engine 350 analyzes image data obtained via the image capture devices 138 and optionally other sensor data to determine the physical objects in the physical environment occupied by user 110. The physical overlay engine 350 can use the data representing the physical objects to construct the overlay image data 352 representing the physical objects.

In some aspects, physical overlay engine 350 includes an edge detector. The edge detector may analyze the image data received from image capture devices 138 to determine edges of the physical objects in the physical environment. The detected edges can be included in the data representing the physical objects and used to render the overlay image data 352. For example, the detected edges can be used to define contour data representing an outline of the physical object. In some aspects, the interior or surface of the outlined portion of a physical object may be fully transparent. In some aspects, the interior of the outlined portion may be defined by surface data or texture data that can represent a color and/or texture of the object, and may be rendered such that the surface of the outlined portion is semitransparent, thereby allowing the artificial reality content to be viewed through the overlay image data 352.

In some aspects, the overlay image data 352 can be portions of the image data as captured from the image capture devices 138 that correspond to the physical objects. For example, the physical overlay engine 350 may determine which portions of the image data captured by image capture devices 138 correspond to physical objects. Other portions of the image data may be cropped or removed such that only the image data representing physical objects is present in the overlay image data 352. The overlay image data 352 may be rendered with the artificial reality content such that the overlay image data 352 is at least semitransparent, thereby allowing the artificial reality content to be seen through the overlay image data 352.

Hand-held device 114 may be a device that provides for user interaction with artificial reality system 10, 20. In the example illustrated in FIG. 3, hand-held device 114 includes one or more processors 346, memory 344, motion sensors 306, and I/O interface 319. The one or more processors 346 and memory 344 may provide a computer platform for executing an operating system 342, which may be an embedded, real-time multitasking operating system, for instance, or other type of operating system. In turn, operating system 346 provides a multitasking operating environment for executing one or more software components. In some examples, processors 346 and memory 344 may be separate, discrete components. In other examples, memory 344 may be on-chip memory collocated with processors 346 within a single integrated circuit.

Hand-held device 114 includes I/O interfaces 319 that provide interfaces to devices on the hand-held device 114 such as button devices on the hand-held controller 114 or touch sensitive surfaces on the hand-held controller 114. Further, I/O interfaces 319 may interfaces for communicating with an associated HMD 112. The communications between hand-held device 114 and HMD 112 may include the status of buttons on the hand-held device, for example, whether a button is pressed or not.

As shown in FIG. 3, in this example, hand-held device 114 further includes one or more motion sensors 306, such as one or more accelerometers (also referred to as IMUs) that output data indicative of current acceleration of hand-held device 114, GPS sensors that output data indicative of a location or position of hand-held device 114, radar or sonar that output data indicative of distances of hand-held device 114 from various objects (e.g., from a wall or other surface), or other sensors that provide indications of a location, position, and/or orientation of hand-held device 114 or other objects within a physical environment.

In some aspects, hand-held device 114 may be a proprietary hand-held device that is designed specifically for use with artificial reality system 10, 20. In further aspects, hand-held device 114 may be a smart phone having software enabling the smart phone to provide the functionality described above to an HMD 112 or console 106.

Further details on the operation of pose tracker 326 and physical overlay engine 350 are provided below with respect to FIGS. 5-8.

Figure 4:
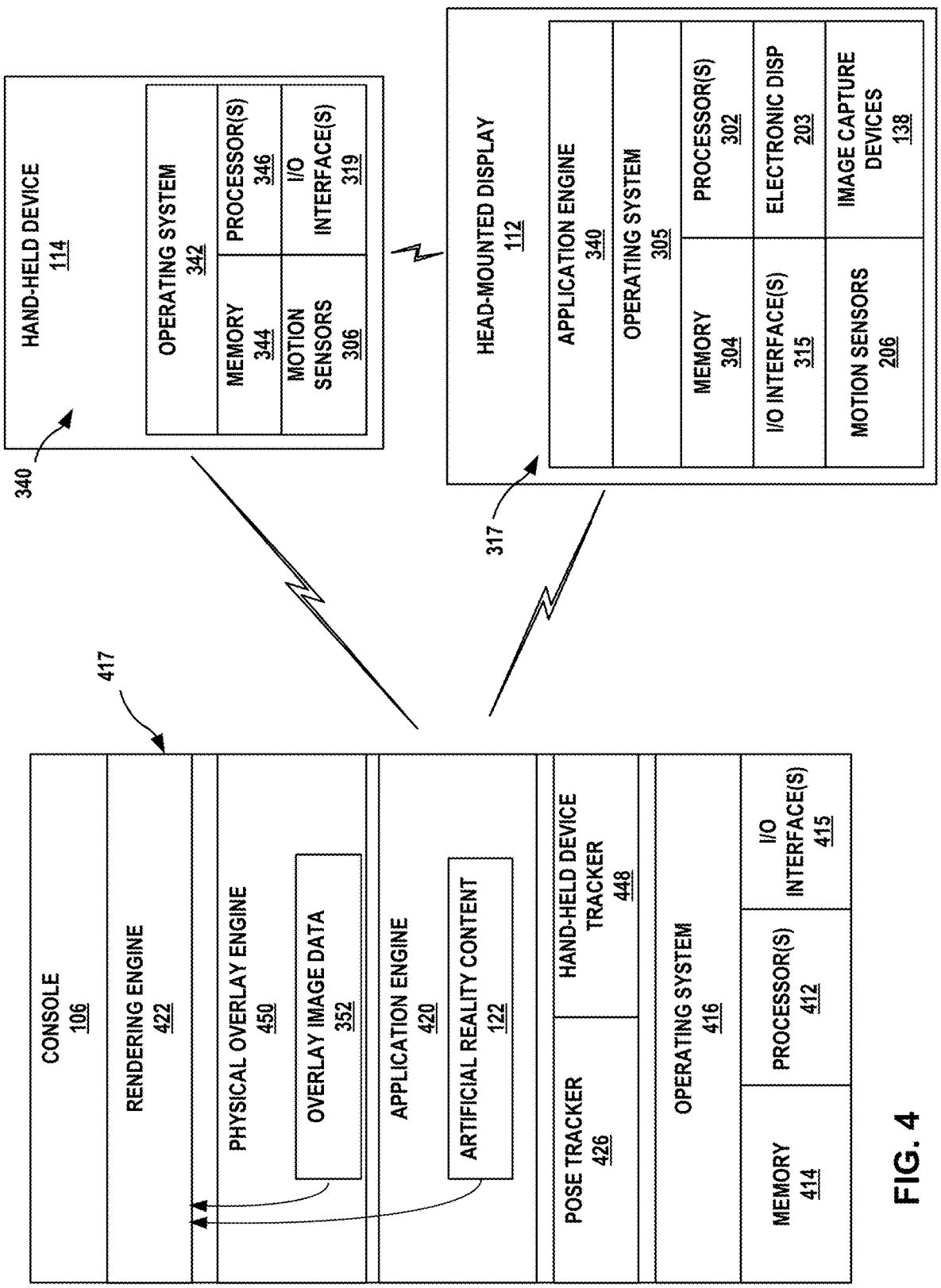
FIG. 4 is a block diagram showing example implementations in which generating and displaying the overlay image is performed by example instances of the console and the HMD of the artificial reality systems of FIGS. 1A, 1B.

FIG. 4 is a block diagram showing example implementations of console 106, HMD 112, and hand-held device 114 of artificial reality system 10, 20 of FIGS. 1A, 1B. In the example of FIG. 4, console 106 performs pose tracking and rendering for HMD 112 in accordance with the techniques described herein based on sensed data, such as motion data received from an HMD 112 and/or hand-held device 114, and image data received from HMD 112 and/or external sensors.

In this example, similar to FIG. 3, HMD 112 includes one or more processors 302 and memory 304 that, in some examples, provide a computer platform for executing an operating system 305, which may be an embedded, real-time multitasking operating system, for instance, or other type of operating system. In turn, operating system 305 provides a multitasking operating environment for executing one or more software components 317. Moreover, processor(s) 302 are coupled to electronic display 203, motion sensors 206, and image capture devices 138.

In general, console 106 is a computing device that processes image and tracking information received from HMD 112 and/or cameras 102 (FIG. 1B), and measurement data from hand-held device 114 to perform pose tracking, and content rendering for HMD 112 and hand-held device 114. In some examples, console 106 is a single computing device, such as a server, workstation, a desktop computer, a laptop, or gaming system. In some examples, at least a portion of console 106, such as processors 412 and/or memory 414, may be distributed across a cloud computing system, a data center, or across a network, such as the Internet, another public or private communications network, for instance, broadband, cellular, Wi-Fi, and/or other types of communication networks for transmitting data between computing systems, servers, and computing devices.

In the example of FIG. 4, console 106 includes one or more processors 412 and memory 414 that, in some examples, provide a computer platform for executing an operating system 416, which may be an embedded, real-time multitasking operating system, for instance, or other type of operating system. In turn, operating system 416 provides a multitasking operating environment for executing one or more software components 417. Processors 412 are coupled to one or more I/O interfaces 415, which provide I/O interfaces for communicating with external devices, such as hand-held controller 114, a keyboard, game controllers, display devices, image capture devices, HMDs, and the like. Moreover, the one or more I/O interfaces 415 may include one or more wired or wireless network interface controllers (NICs) for communicating with a network, such as network 104. Each of processors 302, 346, 412 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 344, 414 may comprise any form of memory for storing data and executable software instructions, such as random-access memory (RAM), read only memory (ROM), programmable read only memory (PROM), erasable programmable read only memory (EPROM), electronically erasable programmable read only memory (EEPROM), and flash memory.

Software applications 417 of console 106 operate to provide an overall artificial reality application. In this example, software applications 417 include application engine 420, rendering engine 422, pose tracker 426, hand-held device tracker 448, and physical overlay engine 450. In general, application engine 420 includes functionality to provide and present an artificial reality application, e.g., a gaming application, a teleconference application, a navigation application, an educational application, training or simulation applications, and the like. Application engine 420 may include, for example, one or more software packages, software libraries, hardware drivers, and/or Application Program Interfaces (APIs) for implementing an artificial reality application on console 106. Responsive to control by application engine 420, rendering engine 422 generates 3D artificial reality content for display to the user by application engine 340 of HMD 112. In some aspects, application engine 420 provides a fully immersive virtual reality experience in which all, or substantially all of the artificial reality content is generated by the application engine 420 and does not include images representative of physical objects in the physical environment occupied by the user.

Additionally, hand-held device tracker 448 may determine a pose for the hand-held device 114. In some aspects, hand-held device tracker 448 may receive information from sensors on the hand-held device 114 and use the received information to determine a pose for the hand-held device 114. Such information may include information from motion sensors 306. Further, hand-held device tracker may use image data obtained via image capture devices 138 to determine a pose for the hand-held device 114.

Application engine 420 and rendering engine 422 construct the artificial content for display to user 110 in accordance with current pose information for HMD 112 within a frame of reference, typically a viewing perspective of HMD 112, as determined by pose tracker 426 and hand-held device tracker 448. Based on the current viewing perspective, rendering engine 422 constructs the 3D, artificial reality content which may in some cases be overlaid, at least in part, upon the real-world 3D environment of user 110. During this process, pose tracker 426 operates on sensed data received from HMD 112 and hand-held device 114, such as image data from sensors on HMD 112, motion sensor data from hand-held device 114, and, in some examples, data from any external sensors 90 (FIGS. 1A, 1B), such as external cameras, to capture 3D information within the real-world environment, such as motion by user 110, motion of hand-held device 114, and/or feature tracking information with respect to user 110. Based on the sensed data, pose tracker 426 determines a current pose for the HMD 112 and the hand-held device 114 within the frame of reference of HMD 112 and, in accordance with the current poses, constructs the artificial reality content for communication, via the one or more I/O interfaces 315, 415, to HMD 112 for display to user 110.

Physical overlay engine 450 may, in response to an activation condition, generate overlay image data 352 that is rendered with the artificial reality content constructed by the application engine 420. As an example, in response to receiving an indication that a button has been pressed on a hand-held device 114, physical overlay engine 450 may generate overlay image data 352. The overlay image data 352 can include representations of physical objects that are within the physical environment occupied by user 110. In some aspects, the physical objects may be those within the field of view of image capture devices 138. In some aspects, the physical object may be those within the field of view of other sensors such as external cameras 102 (FIG. 2).

The representations of the physical objects in the overlay image data 352 may be constructed from data representing the physical objects. In some aspects, the physical overlay engine 450 analyzes image data obtained via the image capture devices 138 and optionally other sensor data to determine the physical objects in the physical environment occupied by user 110. The physical overlay engine 450 can use the data representing the physical objects to construct the overlay image data 352 representing the physical objects.

Like physical overlay engine 350, in some aspects physical overlay engine 450 includes an edge detector. The edge detector may analyze the image data received from image capture devices 138 to determine edges of the physical objects in the physical environment. The detected edges can be included in the data representing the physical objects and used to render the overlay image data 352. For example, the detected edges can be used to render an outline of the physical object. In some aspects, the interior of the outlined portion of a physical object may be fully transparent. In some aspects, the interior of the outlined portion may be filled with a color of the object or other color and may be rendered such that the interior of the outline portion is semitransparent, thereby allowing the artificial reality content to be viewed through the overlay image data 352.

In some aspects, the overlay image data 352 can be portions of the image data as captured from the image capture devices 138 that correspond to the physical objects. For example, the physical overlay engine 450 may determine which portions of the image data captured by image capture devices 138 correspond to physical objects. Other portions of the image data may be cropped such that only the image data representing physical objects is present in the overlay image data 352. The overlay image data 352 may be rendered with the artificial reality content such that the overlay image data 352 is at least semitransparent, thereby allowing the artificial reality content to be seen through the overlay image data 352.

The examples illustrated in FIGS. 3 and 4 include a hand-held device 114. In some implementations, a hand-held device 114 need not be present. In such implementations, the overlay image data 352 may be rendered with artificial reality content in response to an activation condition that is not dependent on a hand-held device 114. Examples of such activation conditions include detection of a voice command, hand position, and/or hand gesture associated with activating display of the overlay image.

Further details on the operation of pose tracker 426 and physical overlay engine 450 are provided below with respect to FIGS. 5-8.

Figure 5:
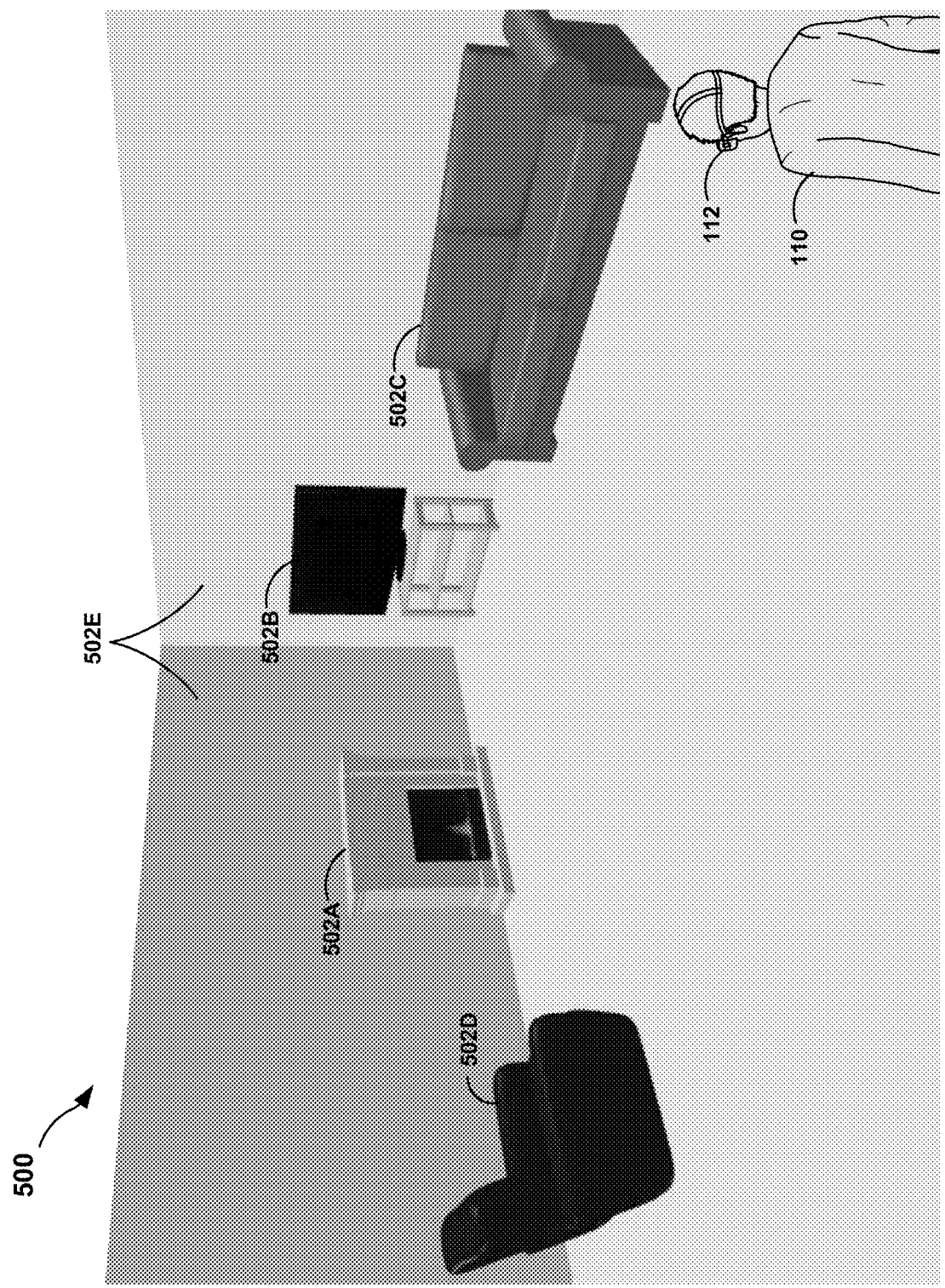
FIG. 5 illustrates an example physical environment.

FIG. 5 illustrates an example physical environment 500 and is used to illustrate aspects of the disclosure. In the example illustrated in FIG. 5, example physical environment 500 includes physical objects 502A-502E (collectively referred to as "physical objects 502"). In particular, example physical environment 500 includes a fireplace 502A, a television 502B, a couch 502C, a chair 502D and walls 502E. Some or all of the physical objects 502 may be within the field of view of an HMD 112 worn by user 110. A physical environment 500 may include fewer or more than the physical objects 502 shown in the example illustrated in FIG. 5. Additionally, a physical environment may include different items than shown in FIG. 5. For example, a physical environment may include plants, stairs, other types of furniture, etc.

In the example illustrated in FIG. 5, physical environment 500 is a room. Other types of physical environments are possible. For example, a physical environment can be an outdoor space in which the physical objects include trees, bushes, shrubs, fences, cars, bikes etc. Further, a physical environment can be an entire floor of a building. The aspects described herein are not limited to any particular type of physical environment.

Figure 6:
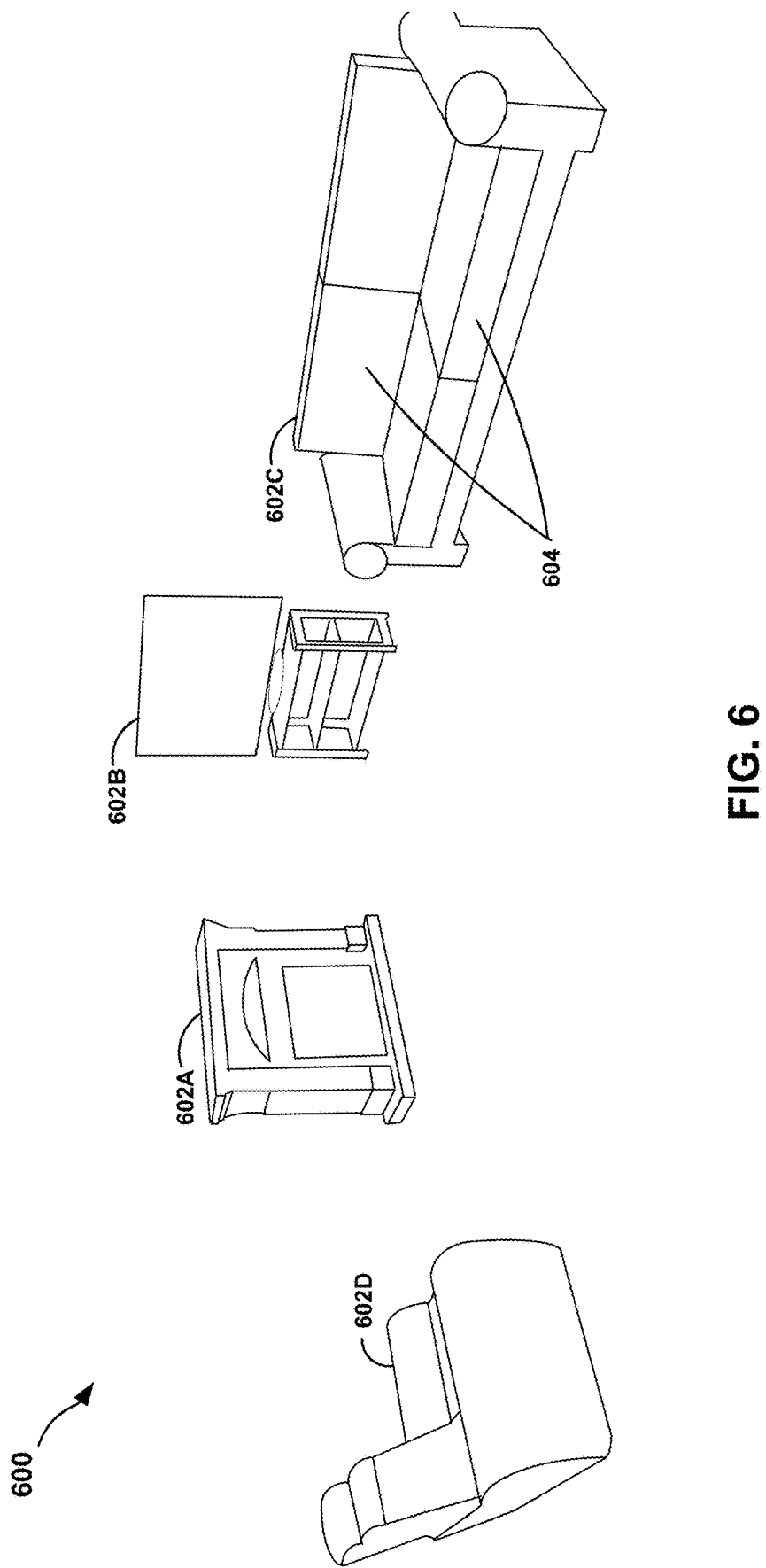
FIG. 6 illustrates an example overlay image corresponding to the example physical environment of FIG. 5.

FIG. 6 illustrates an example physical overlay image 600 corresponding to the example physical environment of FIG. 5. In the example illustrated in FIG. 6, example physical overlay image 600 includes object image data 602A-602D (collectively "object image data 602") corresponding the physical objects 502A-502D of FIG. 5. As discussed above, in some aspects, a physical overlay engine 350, 450 can perform edge detection to determine edges of the physical objects in a physical environment. The detected edges of physical objects 502 can be used to generate object image data 602 such that the object image data 602 comprises contour data that represents an outline of a corresponding physical object. In some aspects, the object image data 602 may only comprise contour data such that the surface or texture of the object is represented as being transparent. In some aspects, the object image data 602 may comprise texture data that represents the color and/or texture of the corresponding physical object. For example, the surface areas 604 of object image data 602C representing couch 502C may be the color and/or texture of the couch 502C. The surface may be generated and rendered so as to be semitransparent thereby allowing artificial reality content to be viewed through the object image data 602. In some aspects, physical objects may include background features of the physical environment itself, for example, walls, ceilings, stairways, decor etc. In other aspects, these background features may be removed such that the image overlay only includes representations of the physical objects within the physical environment are included in the overlay image and the background features are either cropped (e.g., removed) or not included in the overlay image.

Figure 7A:
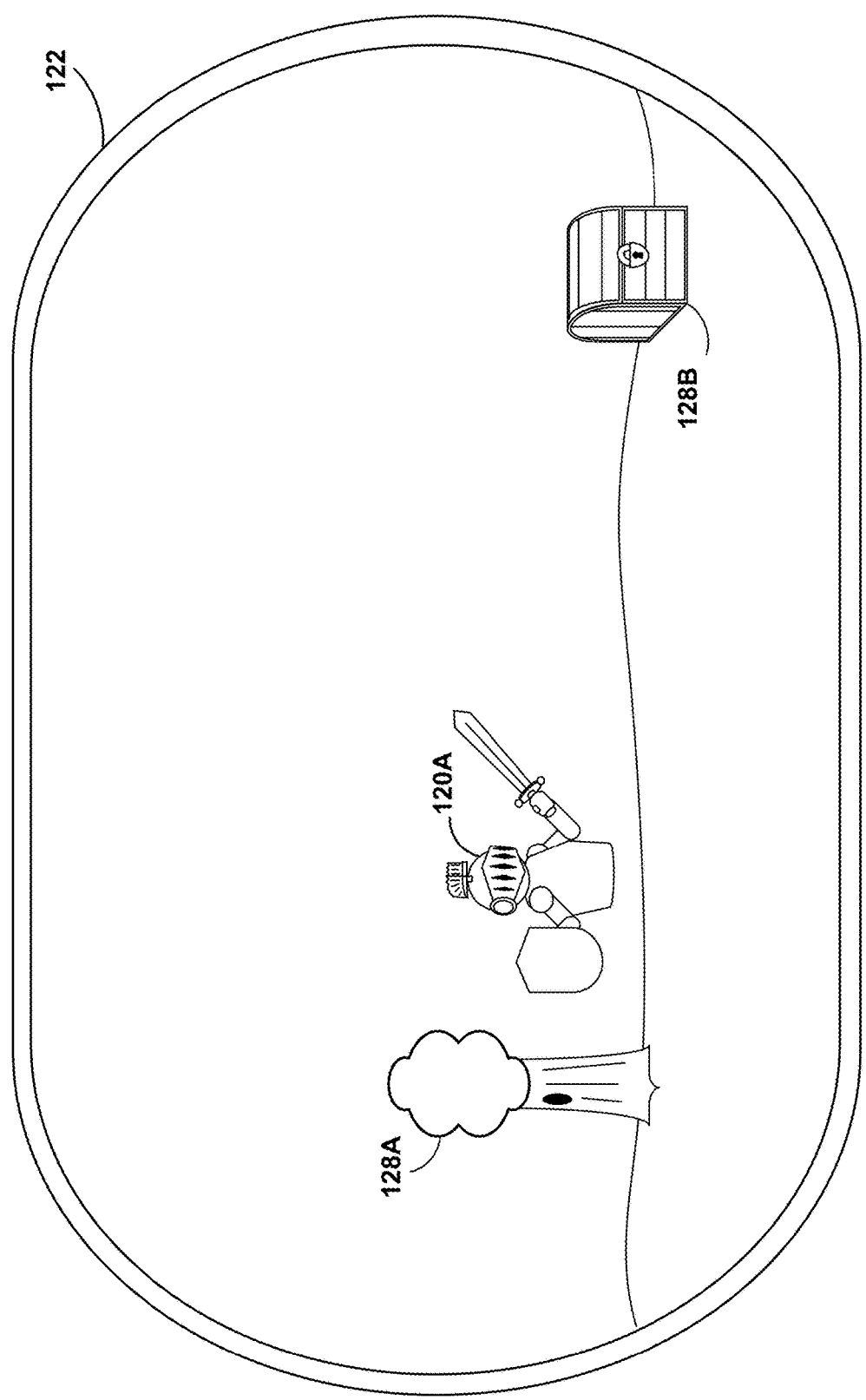
FIG. 7A illustrates example artificial reality content.

FIG. 7A illustrates example artificial reality content 122. In the example illustrated in FIG. 7A, the artificial reality content comprises avatar 120A and virtual objects 128A and 128B described above with respect to FIGS. 1A and 1B.

Figure 7B:
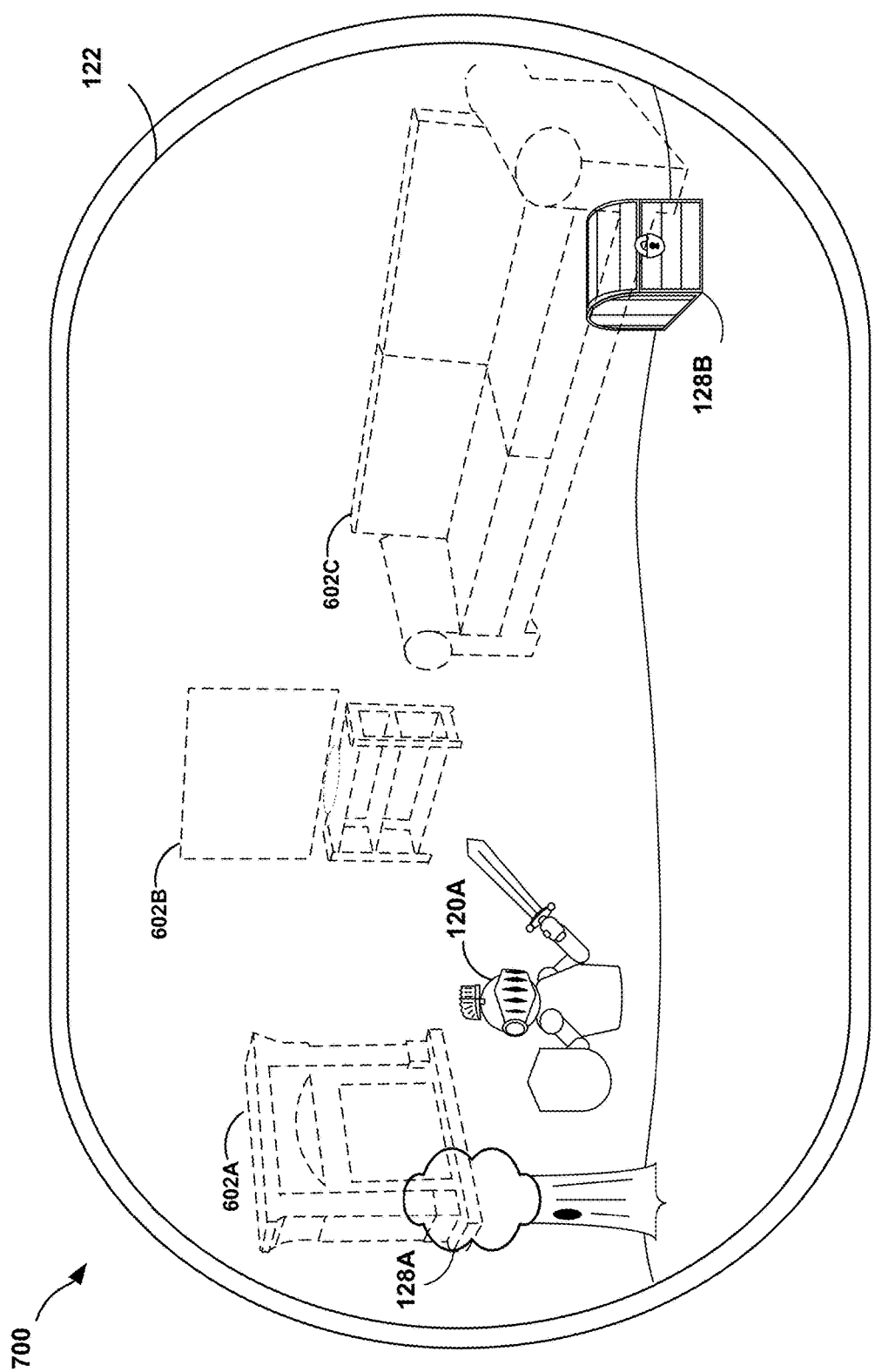
FIG. 7B illustrates an example integrated image in which the example overlay image of FIG. 6 is overlaid on the example artificial reality content of FIG. 7A.

FIG. 7B illustrates an example integrated image 700 in which physical overlay image 600 of FIG. 6 is overlaid on the example artificial reality content 122 of FIG. 7A. As shown in FIG. 7B, object image data 602 may be rendered such that the artificial reality content 122 can be seen through the object image data 602. For example, virtual object 128A can be seen through object image data 602A representing fireplace 502A in the physical environment occupied by user 110. Similarly, virtual object 128B can be seen through object image data 602C representing couch 502C.

Figure 8:
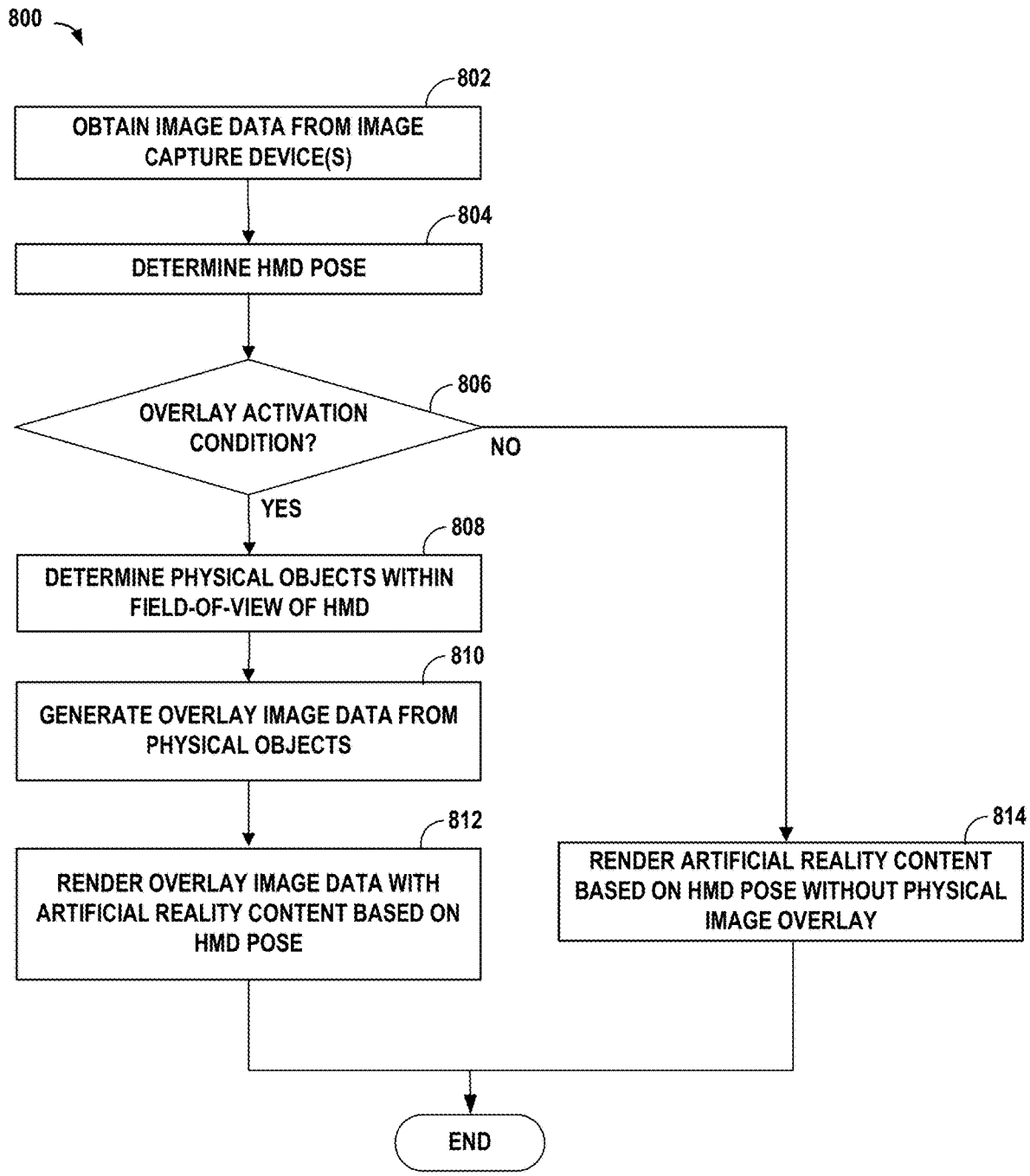
FIG. 8 is a flowchart illustrating example operations of a method for generating and displaying overlay image data in accordance with aspects of the disclosure.

FIG. 8 is a flowchart illustrating example operations of a method for generating and displaying overlay image data 352 in accordance with aspects of the disclosure. The example operations described in flowchart 800 may be performed periodically or in response to an event. For example, the example operations may be performed as part of a response to a display frame generation event where the event causes an artificial reality system 10, 20 to render a display frame for presentation on HMD 112.

A pose tracker may receive image data from one or more image capture devices of an HMD 112 (802). Additionally, the image data may optionally be obtained by cameras or sensors external to the HMD 112. The pose tracker may also receive motion sensor data from motion sensors of HMD 112 and hand-held device 114. The pose tracker may determine a pose for the HMD 112 using the image data and the sensor data (804). Additionally, a hand-held device tracker 348 may determine a pose for the hand-held device 114 from the image data received via the image capture devices and motion sensor data received from motion sensors on the hand-held device 114.

An artificial reality application 340, 420 (or a physical overlay engine 350, 450) may determine whether or not an overlay image activation condition exists (806). In some aspects, the activation condition can be user initiated. For example, the activation condition may be detection of the user pressing a button, for example a button on a hand-held device 114 associated with the HMD 112. As another example, the activation condition may be detection that the hand-held device 114 has been positioned by the user in a particular orientation that is defined as an activation condition. In implementations that do not include a hand-held device 114, the activation condition may be detection that a particular gesture defined as an activation condition has been performed by the user. Also, the activation condition may be detection that the user has issued a voice command to activate generation and display of the overlay image.

In some aspects, the activation condition may be automatically determined. For example, in some aspects, the HMD 112 or hand-held device 114 may be near a physical object. The activation condition may be detecting, by HMD 112 or a console 106, that the HMD 112 or hand-held device 114 is within a threshold distance of a physical object. In some aspects, the activation condition may be determined with respect to a virtual boundary. For example, the activation condition may be detecting that the HMD 112 or hand-held controller is within a threshold distance of the virtual boundary.

In some aspects, the activation condition may be both user initiated and automatically determined.

Figure 9:
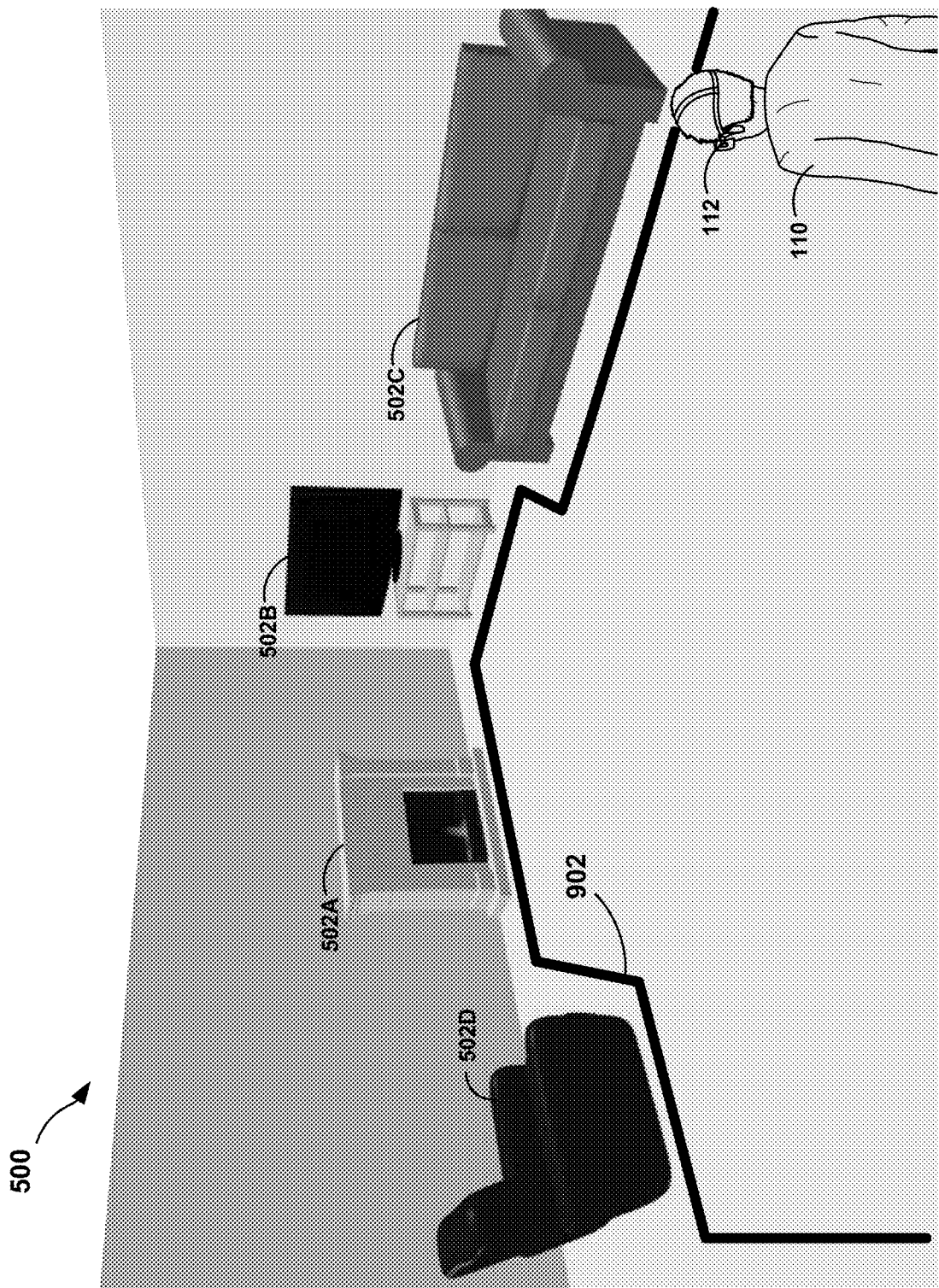
FIG. 9 illustrates an example virtual boundary for the example physical environment of FIG. 5.

FIG. 9 illustrates an example virtual boundary for the example physical environment 500 of FIG. 5. In some aspects, a user 110 can use functionality provided by HMD 112 and/or console 106 to establish a virtual boundary 902 in a physical environment 500. For example, the user may use a hand-held device 114 to "draw" a boundary 902 in a physical environment 500. When the HMD 112 (or hand-held device 114) crosses or comes within a first threshold distance of the virtual boundary 902, HMD 112 may display a warning to the user that they are too close to or have crossed the virtual boundary. Further, in some aspects, the activation condition can be a determination that the HMD 112 or hand-held device 114 has comes within a second threshold distance of the virtual boundary 902, where the first threshold distance is less than the second threshold distance. In such aspects, when the user comes within the second threshold distance, overlay image data 352 may be generated and rendered to warn the user of the location of physical objects in the physical environment 500. As the user comes close to, or crosses the virtual boundary, a second warning may be display via HMD 112 instead of, or in addition to, the overlay image data 352.

Returning to FIG. 8, if the activation condition is satisfied ("YES" branch, 806), then image data or other sensor data can be analyzed to determine the physical objects within the field of view of HMD 112 (808). For example, a machine learning model can be used to identify and distinguish physical objects within the image capture data. Further, edge detection can be used to detect the edges of the physical objects detected within the image capture data. Similarly, edge detection or other techniques can be used to determine the boundaries of image data representative of objects in the image capture data obtained from image capture devices 138. Other image data not representative of physical objects can be cropped, leaving only the image data representative of objects as the overlay image data 352.

Physical overlay engine 350, 450 can generate overlay image data 352 based on the physical objects detected in the image data or other sensor data (810). For example, in some aspects, the physical overlay engine 350, 450 can use the detected edges of the physical objects to generate an outline of the physical objects in the physical object overlay image data 352. In some aspects, physical overlay engine 350, 450 can use the image data obtained after cropping the image capture data as the overlay image data 352.

The rendering engine 322, 422 can render the artificial reality content 122 generated by application engine 340, 420, with the overlay image data 352 such that the overlay image data 352 is at least semi-transparent (812). In some aspects, the rendering engine 322, 422 can render the artificial reality content 122 and overlay image data 352 such that the interior of an outline of the object is at least semi-transparent, thereby allowing the artificial reality content to be viewed through the outline. For example, the outline may be rendered as opaque, while the interior of the outline may be transparent or semi-transparent. In some aspects where the overlay image data 352 is image data taken from the image capture data, rendering engine 322, 422 can render the image data in the overlay image data 352 as semi-transparent, thereby allowing the artificial reality content to be viewed through the image data representative of the physical objects in the overlay image data 352.

If the activation condition is not satisfied ("NO" branch, 806), the rendering engine 322, 422 can render the artificial reality content 122 generated by application engine 340, 420. In this case, the overlay image data 352 is not rendered with the artificial reality content 122. As discussed above, the artificial reality content 122 may not include any image data corresponding to some or all of the physical objects in the physical environment occupied by the user 110. For example, the artificial reality content 122 may be immersive virtual reality content that is computer generated without including image data corresponding to some or all of the physical objects in a physical environment occupied by the user.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head mounted device (HMD) connected to a host computer system, a standalone HMD, a mobile device or computing system, or any other hardware platform capable of providing artificial reality content to one or more viewers.

What is claimed is:

1. An artificial reality system comprising:
    one or more image capture devices configured to capture image data representative of a three-dimensional (3D) physical environment having one or more physical objects;
    a head mounted display (HMD) configured to output artificial reality content associated with a 3D virtual environment;
    a physical overlay engine; and
    a rendering engine configured to render, based on a pose of the HMD, output image data comprising the artificial reality content without including image data representative of the physical objects in the 3D physical environment;
    wherein in response to a user-initiated activation condition associated with a hand-held device, the physical overlay engine determines, from the image data, data representing the physical objects, and generates, from the data representing the physical objects, overlay image data representing the physical objects, and
    wherein the rendering engine is configured to render the overlay image data representing the physical objects with the output image data comprising the artificial reality content in response to the activation condition, and to continue to render the overlay image data while the activation condition is present or for a predetermined or configurable time after the activation condition is initiated.

2. The artificial reality system of claim 1, wherein the physical overlay engine is configured to generate the overlay image data to include contour data for the physical objects.

3. The artificial reality system of claim 1, wherein the artificial reality content comprises fully immersive artificial reality content.

4. The artificial reality system of claim 1, further comprising:
    a hand-held device tracker configured to determine a current orientation of the hand-held device, wherein the activation condition comprises one of:
        a detection of a button press of at least one button of the hand-held device, or
        a determination that the current orientation of the hand-held device comprises an overlay activation orientation.

5. The artificial reality system of claim 1, further comprising a pose tracker, wherein the pose tracker is configured to detect that the HMD has crossed a virtual boundary, and wherein the activation condition comprises detection of the HMD crossing the virtual boundary.

6. The artificial reality system of claim 1, further comprising a pose tracker, wherein the pose tracker is configured to:
    detect a distance of the HMD from one of the physical objects in the 3D physical environment; and
    wherein the activation condition comprises a determination that the distance is less than a configurable or predetermined threshold.

7. The artificial reality system of claim 1, further comprising:
    a hand-held device tracker configured to determine a distance of the hand-held device from one of the physical objects in the 3D physical environment;
    wherein the activation condition comprises a determination that the distance is less than a configurable or predetermined threshold.

8. The artificial reality system of claim 1, wherein the physical overlay engine includes an edge detector configured to determine one or more edges of the one or more physical objects in the 3D physical environment, and wherein the data representing the physical objects is determined according to the one or more edges of the one or more physical objects.

9. A method comprising:
    obtaining image data representative of a three-dimensional (3D) physical environment having one or more physical objects;

rendering, by a rendering engine of an artificial reality system and based on a pose of a head mounted display (HMD) representing an estimated position and orientation of the HMD within the 3D physical environment, output image data comprising artificial reality content without including image data representative of the one or more physical objects; and in response to a user-initiated activation condition associated with a hand-held device, determining, from the image data, data representing the one or more physical objects, generating, from the data representing the physical objects, overlay image data representing the physical objects, and rendering, by the rendering engine while the activation condition is present or for a predetermined or configurable time after the activation condition is initiated, the overlay image data representing the physical objects with the output image data comprising the artificial reality content.

10. The method of claim 9, wherein generating the overlay image data comprises generating contour data for the one or more physical objects.

11. The method of claim 9, wherein generating the overlay image data comprises generating texture data for the one or more physical objects.

12. The method of claim 9, wherein the activation condition comprises one of:

determining that a current orientation of the hand-held device of the artificial reality system comprises an overlay activation orientation; or detecting a button press on the hand-held device of the artificial reality system.

13. The method of claim 9, wherein the activation condition comprises detection of the HMD crossing a virtual boundary.

14. The method of claim 9, wherein the activation condition comprises detecting that the HMD is within a configurable or predetermined distance from one of the physical objects in the 3D physical environment.

15. The method of claim 9, wherein the activation condition comprises detecting that the hand-held device is within a configurable or predetermined distance from one of the physical objects in the 3D physical environment.

16. The method of claim 9, further comprising:

determining one or more edges of the one or more physical objects in the 3D physical environment, wherein the data representing the one or more physical objects is determined according to the one or more edges of the one or more physical objects.

17. A non-transitory, computer-readable medium comprising instructions that, when executed, cause one or more processors of an artificial reality system including a head mounted display (HMD) to:

obtain image data representative of a three-dimensional (3D) physical environment having one or more physical objects;

determine an HMD pose representing an estimated position and orientation of the HMD within the 3D physical environment;

render, based on the HMD pose, output image data comprising artificial reality content without including image data representative of the one or more physical objects; and in response to a user-initiated activation condition associated with a hand-held device, determine, from the image data, data representing the one or more physical objects, and generate, from the data representing the one or more physical objects, overlay image data representing the physical objects, and render the overlay image data representing the physical objects with the output image data comprising the artificial reality content while the activation condition is present or for a predetermined or configurable time after the activation condition is initiated.

* * * * *